(12) United States Patent
Nadarajah et al.

(10) Patent No.: US 7,712,120 B2
(45) Date of Patent: May 4, 2010

(54) SYSTEM AND METHOD FOR DISTRIBUTING DBS CONTENT TO MULTIPLE RECEIVERS IN THE HOME OVER A SINGLE COAX

(75) Inventors: Dinesh Nadarajah, Austin, TX (US); Ahmad C. Ansari, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1038 days.

(21) Appl. No.: 10/899,378

(22) Filed: Jul. 26, 2004

(65) Prior Publication Data

US 2006/0018345 A1   Jan. 26, 2006

(51) Int. Cl.
*H04N 7/20* (2006.01)
(52) U.S. Cl. .............................. 725/65; 725/61; 725/71
(58) Field of Classification Search ............... 725/61–78
See application file for complete search history.

(56) References Cited

U.S. PATENT DOCUMENTS

| | | | |
|---|---|---|---|
| 5,155,590 A | 10/1992 | Beyers, II et al. | |
| 6,481,013 B1 | 11/2002 | Dinwiddie et al. | |
| 6,600,730 B1 * | 7/2003 | Davis et al. | 370/343 |
| 6,622,307 B1 * | 9/2003 | Ho | 725/120 |
| 6,691,311 B1 * | 2/2004 | Yata et al. | 725/68 |
| 7,130,576 B1 * | 10/2006 | Gurantz et al. | 455/3.02 |
| 2003/0140345 A1 * | 7/2003 | Fisk et al. | 725/78 |
| 2004/0060074 A1 | 3/2004 | Basawapatna et al. | |
| 2005/0071877 A1 * | 3/2005 | Navarro | 725/68 |
| 2005/0193419 A1 * | 9/2005 | Lindstrom et al. | 725/71 |

OTHER PUBLICATIONS

International Search Report for International Patent No. PCT/US0524699, mailed on May 4, 2006.
Written Opinion of the International Searching Authority for PCT/US0524699, mailed on May 4, 2006.

* cited by examiner

*Primary Examiner*—Christopher Kelley
*Assistant Examiner*—Charles N Hicks
(74) *Attorney, Agent, or Firm*—Toler Law Group

(57) ABSTRACT

A satellite transponder switch (STS) maintains a table that maps set-top boxes (STBs) to carrier frequencies. The STS receives a first request from a first STB for a first transponder band and a second request from a second STB for a second transponder band. The STS accesses a first satellite feed and polarity based on the first request, and a second satellite feed and polarity based on the second request. The STS band-pass filters the first and second transponder bands from the first and second satellite feed and polarity, respectively. The STS frequency shifts the first transponder band to a first carrier frequency assigned to the first STB and the second transponder band to a second carrier frequency assigned to the second STB. The STS outputs a signal that comprises the frequency-shifted first and second transponder bands to the first STB and the second STB.

14 Claims, 4 Drawing Sheets

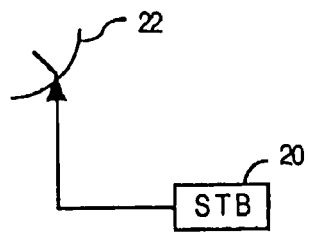
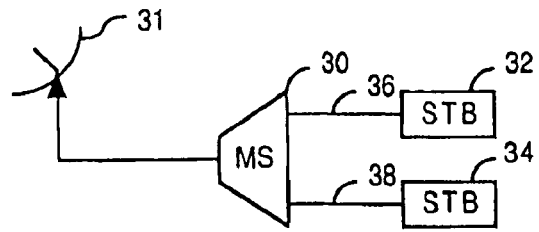
FIG. 1 (PRIOR ART)    FIG. 2 (PRIOR ART)
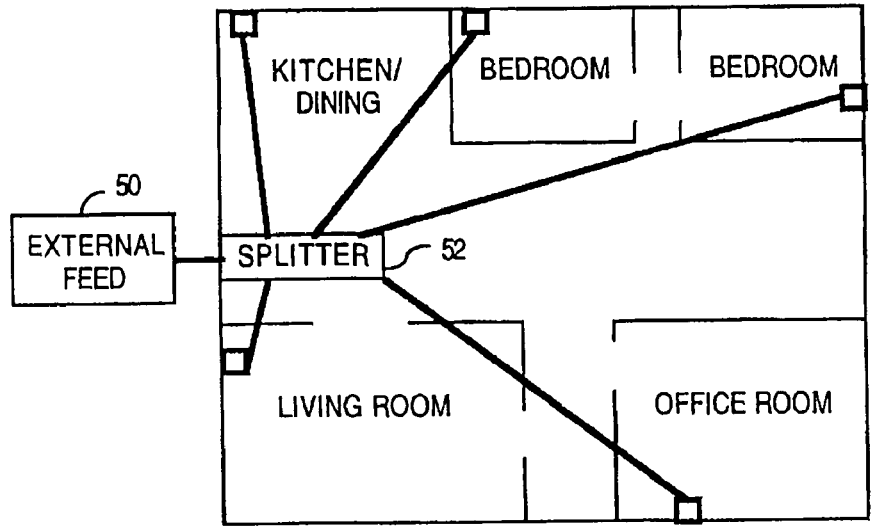
FIG. 4 (PRIOR ART)
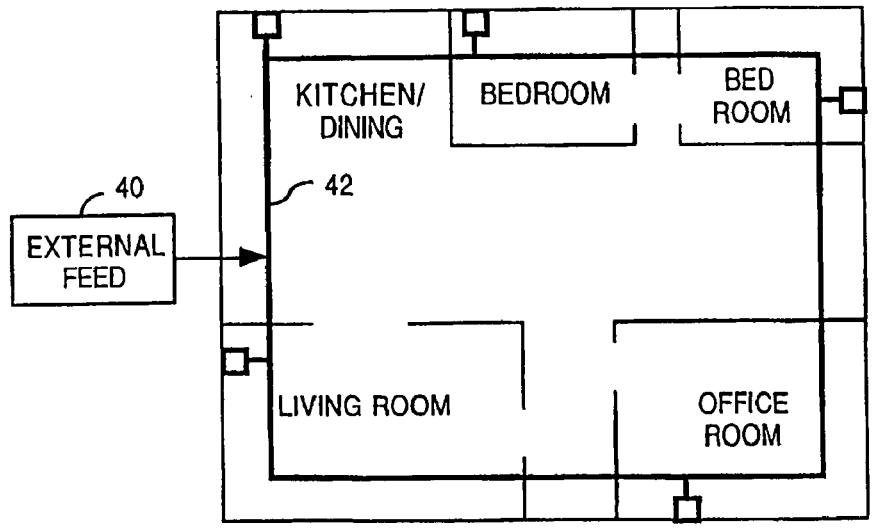
FIG. 3 (PRIOR ART)

SYSTEM AND METHOD FOR DISTRIBUTING DBS CONTENT TO MULTIPLE RECEIVERS IN THE HOME OVER A SINGLE COAX

FIELD OF THE DISCLOSURE

The present disclosure relates to methods and systems for distributing direct broadcast satellite (DBS) to multiple receivers in a home.

DESCRIPTION OF THE RELATED ART

FIG. 1 is a schematic, block diagram illustrating a single low noise amplifier (LNA/B), single set top box (STB) 20 configuration within a home. A single DBS dish receiver 22 with one LNA/B module receives a signal with dual polarity—horizontal and vertical. Each polarity occupies a spectrum in the range of 950 MHz to 1450 MHz. The particular spectrum content and polarity configurations are dependent on the DBS service provider. Since both polarities occupy the same spectrum, the STB 20 communicates with the LNA/B to select a particular polarity and acquire a selected programming channel. One technique to select the polarity is to use direct current (DC) voltage switching. In this case, the STB 20 sends a voltage signal to the LNA/B to switch to the appropriate polarity. For example, a 13V signal may cause the vertical polarity to be selected, and an 18V signal may cause the horizontal polarity to be selected.

FIG. 2 is a schematic, block diagram illustrating a single LNA/B, multiple STB configuration within a home. This configuration includes a matrix switch 30 that intelligently switches to provide appropriate programming signals from the DBS dish 31 to multiple STBs 32 and 34. Each STB receiver 32 and 34 is directly connected to the matrix switch 30 by a respective dedicated coaxial cable 36 and 38. For example, a respective coaxial output in each room in the home may be directly connected to the matrix switch 30. The matrix switch 30 communicates with each STB 32 and 34 using a predetermined frequency.

The matrix switch 30 determines how many unique satellites are providing programming signals. In a request for a particular one of the programming channels, an STB 32 or 34 sends its unique STB identifier to the matrix switch 30 via the predetermined frequency. The matrix switch 30 receives the request, and based thereon acquires the particular programming channel which includes switching between two polarities of the LNA/B. In particular, when the STB 32 or 34 requests a particular polarity from a particular satellite, the matrix switch 30 switches to the proper polarity from that satellite. The matrix switch 30 provides the acquired programming channel to the particular STB 32 or 34 identified by the unique identifier.

FIG. 3 is a schematic, block diagram of an architecture for in-home distribution of an external feed 40 of cable and/or satellite signals. This early architecture for in-home coaxial distribution networks uses radio frequency (RF) taps to tap a single cable 42, that is run throughout a home, in each room that is to be supplied a cable or satellite signal. This architecture is similar to a ring topology with drops in different rooms.

FIG. 4 is a schematic, block diagram of another architecture for in-home distribution of an external feed 50 of cable and/or satellite signals. This architecture uses direct coaxial drops to every room from a single location. The single location is typically at the side of the house close to a cable company's home drops. An RF splitter 52 splits an incoming RF signal to provide programming signals to multiple rooms in the house. This architecture is similar to a star network topology. Distributing a DBS signal using a matrix switch through an in-home coaxial distribution network having a ring topology is more challenging than for a star topology.

FIG. 5 is a schematic, block diagram illustrating a multiple LNA/B, multiple STB configuration within a home. This configuration is used in instances when DBS service providers use more than one satellite for their programming content. In the example of FIG. 5, a first dish 60 has a single LNA/B and a second dish 62 has two LNA/Bs. A matrix switch 64 is to switch between any of the three LNA/Bs as well as their two polarities, resulting in six different input spectra possibilities, for delivery to STBs 66 and 68.

FIG. 6 is a schematic, block diagram illustrating a multiple LNA/B feeding multiple STBs 70 and 72 over a single RG-6 coaxial feed 73. Both STBs 70 and 72 are coupled to the same output port of a matrix switch 74 via the single RG-6 coaxial feed. A band-stacking approach, illustrated in FIG. 7, is used by the matrix switch 74 to serve the STBs 70 and 72. A first STB 70 receives its signals on a lower band of 950-1550 MHz, and a second STB 72 receives its signals on an upper band of 1650-2150 MHz. This configuration requires the in-home cable wiring to be capable of carrying high frequency signals greater than 2 GHz, and requires the STBs 70 and 72 to have wideband tuners to cover the wider range of frequencies. The RG-6 cable 73 is capable of carrying signals with frequencies greater than 2 GHz, but lower-grade cables such as RG-59 are unsuited for these frequencies.

A shortcoming of the aforementioned configurations is that an entire signal bandwidth of a particular polarity is sent from a matrix switch to a STB. This limits the number of STBs served per RG-6 cable to two. To serve more than two STBs using an existing matrix switch, DBS installers may run an extra cable, which adds to the overall cost of providing the service and complicates the installation. Accordingly, there is a need for an improved system and method of distributing DBS content to multiple STBs.

BRIEF DESCRIPTION OF THE DRAWINGS

The present invention is pointed out with particularity in the appended claims. However, other features are described in the following detailed description in conjunction with the accompanying drawings in which:

FIG. 1 (Prior Art) is a schematic, block diagram illustrating a single LNA/B, single set top box (STB) configuration within a home;

FIG. 2 (Prior Art) is a schematic, block diagram illustrating a single LNA/B, multiple STB configuration within a home;

FIG. 3 (Prior Art) is a schematic, block diagram of an architecture for in-home distribution of cable and/or satellite signals;

FIG. 4 (Prior Art) is a schematic, block diagram of another architecture for in-home distribution of cable and/or satellite signals;

DETAILED DESCRIPTION OF THE DRAWINGS

This disclosure provides a new approach that includes segmenting the spectrum into finer bandwidths to distribute DBS content to multiple STBs in a home over a single coaxial cable.

Figure 5:
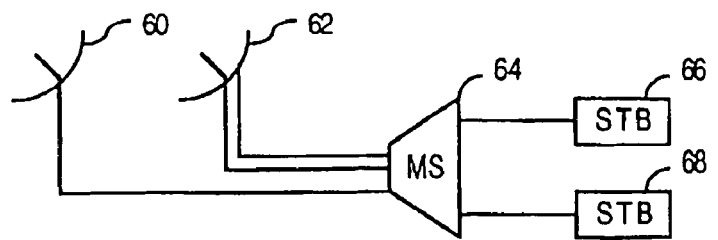
FIG. 5 (Prior Art) is a schematic, block diagram illustrating a multiple LNA/B, multiple STB configuration within a home.
Figure 6:
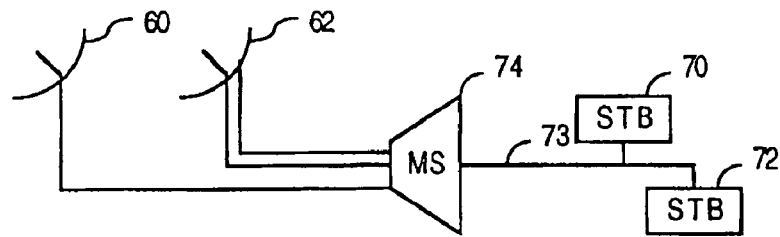
FIG. 6 (Prior Art) is a schematic, block diagram illustrating a multiple LNA/B feeding multiple STBs over a single RG-6 coaxial feed.
Figure 7:
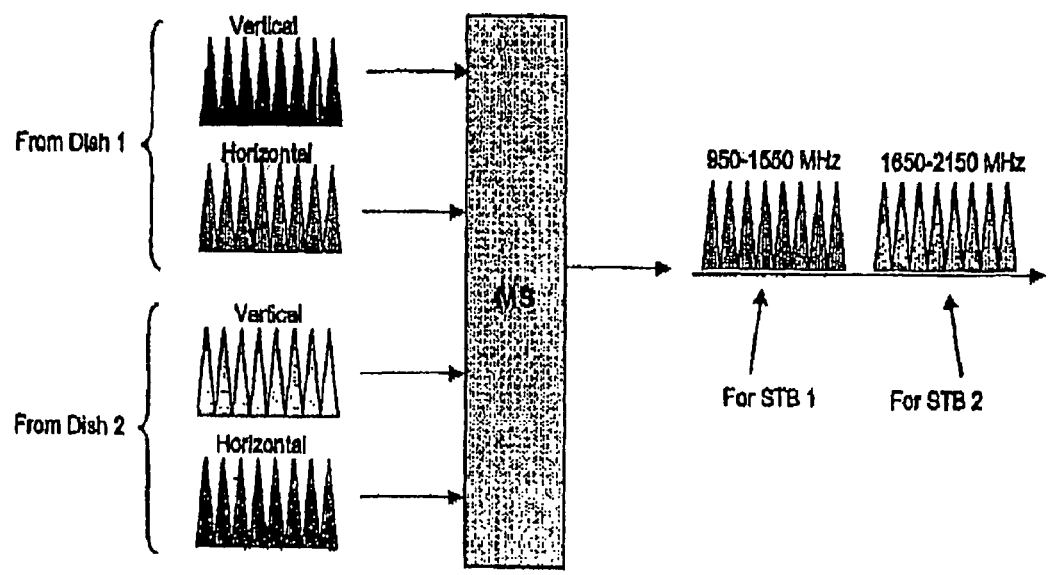
FIG. 7 (Prior Art) illustrates a band-stacking approach used by a matrix switch to serve multiple STBs.
Figure 8:
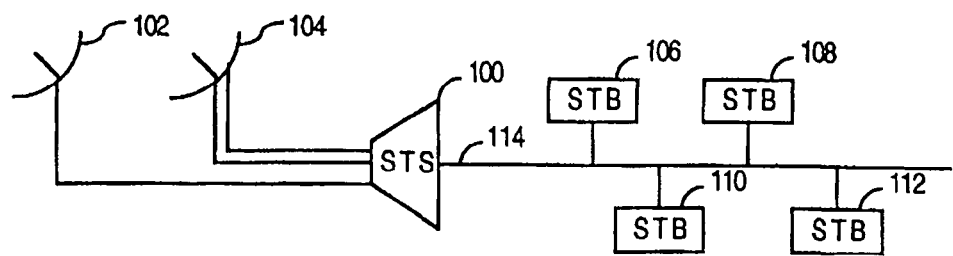
FIG. 8 is a schematic, block diagram of an embodiment of an in-home DBS distribution system.

FIG. 8 is a schematic, block diagram of an embodiment of an in-home DBS distribution system. The system comprises a satellite transponder switch (STS) 100 that acts as a gateway device to isolate one or more satellite receivers 102 and 104 from multiple STBs 106, 108, 110 and 112 in a home coaxial network 114. The STS 100 can be used for both a star topology (e.g. an existing network illustrated in FIG. 4) and a ring topology (e.g. an existing network illustrated in FIG. 3) of the home coaxial network 114.

Figure 9:
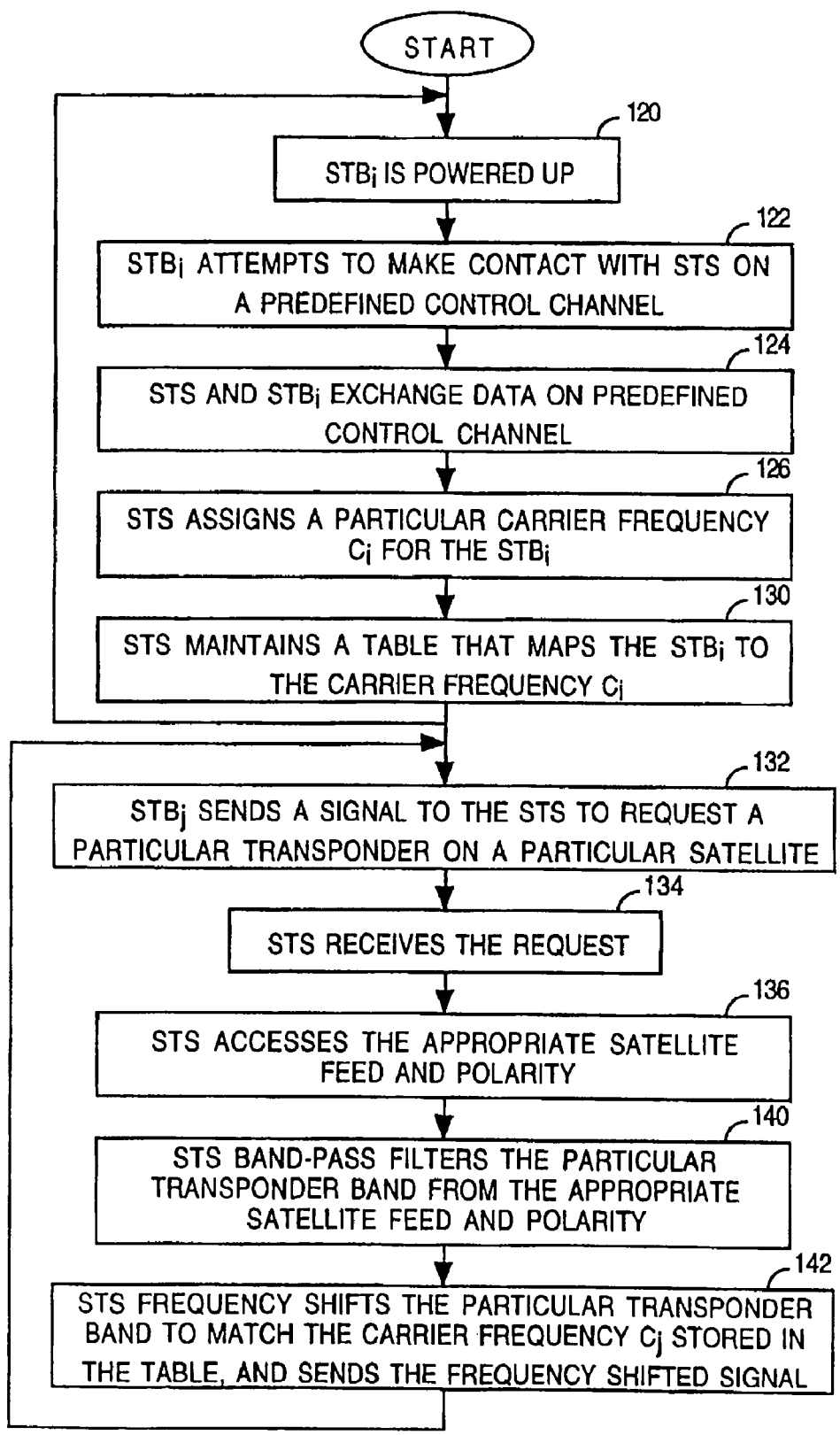
FIG. 9 is a flow chart of an embodiment of a method performed by components of the system of FIG. 8.

FIG. 9 is a flow chart of an embodiment of a method performed by components of the system of FIG. 8. When a STB is powered up as indicated by block 120, the STB attempts to make contact with the STS 100 on a predefined control channel, as indicated by block 122. As indicated by blocks 124 and 126, the STS and the STB exchange data on the predefined control channel and the STS assigns a particular carrier frequency $C_i$ for the $STB_i$. As indicated by block 130, the STS maintains a table that maps each $STB_i$ to a particular carrier frequency $C_i$. The $STB_i$ is configured to listen on frequency $C_i$ for its signal. Repeating these acts for each of the STBs in the home results in the table mapping each of the STBs to a respective unique frequency.

The STS 100 is rated for a number of supported STB units. This number depends on the number of filters inside the STS 100 and the granularity and spectral separation between carrier frequencies. The spectral bandwidth assigned for each STB and the separation between carrier frequencies depends on the particular configuration and the bandwidth for one transponder spectrum.

In one embodiment, a band of about 50 MHz is assigned per STB to carry one transponder spectrum. A separation band of about 10 MHz between STB bands results in a total spectrum per STB of about 60 MHz. Thus, adjacent pairs of carrier frequencies are spaced apart by about 60 MHz in this embodiment. Twenty STBs can be served in a bandwidth of 20*60 MHz=1200 MHz, which may be included in a band from 950-2150 MHz on an RG-6 cable. Ten STBs can be served in a bandwidth of 10*60 MHz=600 MHz, which may be included in a band from 950-1550 MHz on an RG-59 cable.

As indicated by block 132, one of the STBs sends a signal to the STS 100 to request a particular transponder on a particular satellite. Typically, a satellite has from about 20 to 35 or more transponders. Each transponder transmits in either the horizontal or vertical polarity at once, and not on both. Each transponder transmits on a frequency spectrum with a bandwidth of about 30-40 MHz.

The STS 100 receives the request signal (block 134), and in response thereto, accesses the appropriate satellite feed and polarity (block 136), band-pass filters the particular transponder signals from the appropriate satellite feed and polarity (block 140), and frequency shifts the particular transponder band to match the carrier frequency of the requesting STB as stored in the table (block 142). Repeating these acts for multiple STBs results in each of multiple carrier frequencies from the table being used to carry a respective transponder spectrum.

Figure 10:
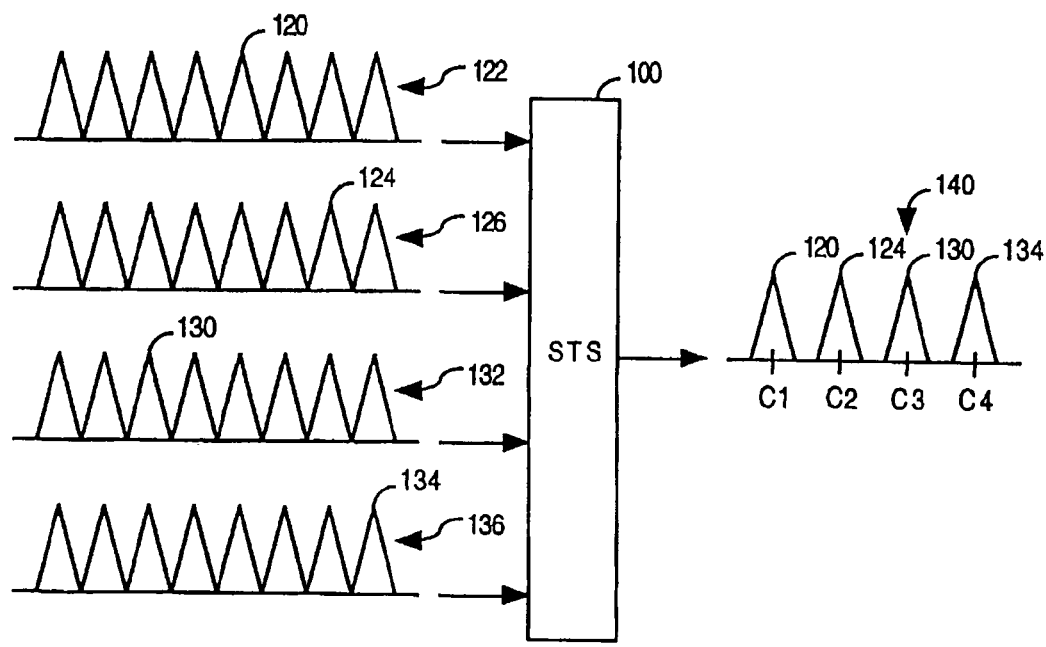
FIG. 10 is a schematic, block diagram illustrating spectral output from a satellite transponder switch (STS) to multiple STBs.

FIG. 10 is a schematic, block diagram illustrating spectral output from the STS 100 to multiple STBs 106, 108, 110 and 112 over the home coaxial network 114. For purposes of illustration and example, the STS 100 has assigned carrier frequency C1 to the STB 106, carrier frequency C2 to the STB 108, carrier frequency C3 to the STB 110, and carrier frequency C4 to the STB 112.

Also for purposes of illustration and example, consider the STB 106 requesting a first channel contained within a transponder band 120 from a spectrum 122 of signals received by the satellite receiver 102 having a vertical polarity. Consider the STB 108 requesting a second channel contained within a transponder band 124 from a spectrum 126 of signals received by the satellite receiver 102 having a horizontal polarity. Consider the STB 110 requesting a third channel contained within a transponder band 130 from a spectrum 132 of signals received by the satellite receiver 104 having a vertical polarity. Consider the STB 112 requesting a fourth channel contained within a transponder band 134 from a spectrum 136 of signals received by the satellite receiver 104 having a horizontal polarity.

The STS 100 filters the transponder band 120 from the spectrum 122 and frequency shifts the transponder band 120 to the carrier frequency C1. The STS 100 filters the transponder band 124 from the spectrum 126 and frequency shifts the transponder band 124 to the carrier frequency C2. The STS 100 filters the transponder band 130 from the spectrum 132 and frequency shifts the transponder band 130 to the carrier frequency C3. The STS 100 filters the transponder band 134 from the spectrum 136 and frequency shifts the transponder band 134 to the carrier frequency C4. The resulting spectrum of signals outputted by the STS 100 to the home coaxial network 114 is indicated by reference numeral 140.

The STBs 106, 108, 110 and 112 receive the spectrum 140 via the home coaxial network 114. The STB 106 tunes to the carrier frequency C1 to extract the transponder band 120 from the spectrum 140, and extracts the first channel from the extracted transponder band 120. The STB 108 tunes to the carrier frequency C2 to extract the transponder band 124 from the spectrum 140, and extracts the second channel from the extracted transponder band 124. The STB 110 tunes to the carrier frequency C3 to extract the transponder band 130 from the spectrum 140, and extracts the third channel from the extracted transponder band 130. The STB 112 tunes to the carrier frequency C4 to extract the transponder band 134 from the spectrum 140, and extracts the fourth channel from the extracted transponder band 134.

In conclusion, traditional satellite distribution configurations have been limited by the number of STBs that can be supported in a home using a single cable feed. Embodiments of the STS can carry more than 10 transponder signals on an RG-59 cable system and more than 20 on an RG-6 cable system. Thus, both narrowband and wideband STB tuners can be used to provide a robust distribution network. No special in-home configuration is required to support multiple STBs by the STS. Each STB tunes to a single narrow band channel on the cable to receive its requested programming.

It will be apparent to those skilled in the art that the disclosed embodiments may be modified in numerous ways and may assume many embodiments other than the preferred forms specifically set out and described herein. As used herein, the term "set-top box" is to be construed as inclusive of set-top terminal functionality either internal to or external to a television or display monitor.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   at least one satellite receiver;
   a plurality of set-top boxes (STBs) including a first STB and a second STB; and
   a satellite transponder switch (STS) to serve the plurality of STBs in a home, the STS to maintain a table that maps each of the STBs to a corresponding one of a plurality of carrier frequencies wherein each one of the plurality of carrier frequencies is unique to a particular STB of the plurality of STBs, the STS to receive a first request from the first STB for a first transponder band and a second request from the second STB for a second transponder band, to access a first satellite feed and polarity from the at least one satellite receiver based on the first request and a second satellite feed and polarity from the at least one satellite receiver based on the second request, to band-pass filter the first transponder band from the first satellite feed and polarity and the second transponder band from the second satellite feed and polarity, to frequency shift the first transponder band to a first carrier frequency assigned to the first STB in the table and the second transponder band to a second carrier frequency assigned to the second STB in the table, and to output to the first STB and the second STB a signal that comprises the frequency-shifted first and second transponder bands wherein the frequency-shifted first and second transponder bands are separated by a separation band, and wherein the first carrier frequency of the signal is unique to the first STB and wherein the second carrier frequency of the signal is unique to the second STB, wherein the first STB upon power-up is to contact the STS on a control channel and thereafter the STS is to assign the first carrier frequency to the first STB.

2. The system of claim 1 wherein the separation band is about 10 MHz.

3. The system of claim 1 wherein the at least one satellite receiver comprises a first satellite receiver and a second satellite receiver, wherein the first transponder band is received by the first satellite receiver and the second transponder band is received by the second satellite receiver.

4. The system of claim 1 wherein the first carrier frequency and the second carrier frequency differ by about 60 MHz.

5. The system of claim 1 wherein the carrier frequencies are spaced apart by about 60 MHz.

6. The system of claim 1 wherein the STS is to serve at least ten STBs via an RG-59 cable.

7. The system of claim 1 wherein the STS is to serve at least twenty STBs via an RG-6 cable.

8. A method comprising:
   providing a satellite transponder switch (STS) to serve a plurality of set-top boxes (STBs) in a home;
   maintaining a table by the STS that maps each of the plurality of STBs to a corresponding one of a plurality of carrier frequencies wherein each one of the plurality of carrier frequencies is unique to a particular STB of the plurality of STBs;
   receiving by the STS a first request from the first STB for a first transponder band and a second request from the second STB for a second transponder band;
   receiving contact on a control channel from the first STB during power-up of the first STB;
   assigning a first carrier frequency to the first STB in response to contact from the first STB on the control channel;
   accessing a first satellite feed and polarity from the at least one satellite receiver based on the first request and a second satellite feed and polarity from the at least one satellite receiver based on the second request;
   band-pass filtering a first transponder band from the first satellite feed and polarity and a second transponder band from the second satellite feed and polarity;
   frequency shifting the first transponder band to a first carrier frequency assigned to the first STB in the table and the second transponder band to a second carrier frequency assigned to the second STB in the table; and
   outputting to the first STB and the second STB a signal that comprises the frequency-shifted first and second transponder bands wherein the frequency-shifted first and second transponder bands are separated by a separation band, and wherein the first carrier frequency of the signal is unique to the first STB and wherein the second carrier frequency of the signal is unique to the second STB.

9. The method of claim 8 wherein the at least one satellite receiver comprises a first satellite receiver and a second satellite receiver, wherein the first transponder band is received by the first satellite receiver and the second transponder band is received by the second satellite receiver.

10. The method of claim 8 wherein the first carrier frequency and the second carrier frequency differ by about 60 MHz.

11. The method of claim 8 wherein the carrier frequencies are spaced apart by about 60 MHz.

12. The method of claim 8 wherein the STS is to serve at least ten STBs via an RG-59 cable.

13. The method of claim 8 wherein the STS is to serve at least twenty STBs via an RG-6 cable.

14. A method comprising:
   providing a satellite transponder switch (STS) to serve a plurality of set-top boxes (STBs) in a home;
   receiving over a control channel an attempt of a first STB of the STBs to make contact with the STS;
   based on said receiving, assigning by the STS a carrier frequency for the STB;
   maintaining a table in the STS that maps each of the STBs of the plurality of STBs to a plurality of different carrier frequencies wherein each one of the plurality of carrier frequencies is unique to a particular STB of the plurality of STBs;
   receiving by the STS a request from the first STB for a particular transponder band on a particular satellite;
   based on the request, accessing a particular satellite feed and polarity from a satellite receiver coupled to the STS;
   receiving contact on a control channel from the first STB during power-up of the first assigning a first carrier frequency to the first STB in response to contact from the first STB on the control channel;
   band-pass filtering the particular transponder band from the particular satellite feed and polarity;
   frequency shifting the particular transponder band to the carrier frequency assigned to the first STB in the table;
   separating the frequency-shifted particular transponder band from an adjacent frequency-shifted transponder band by a separation band; and
   outputting the frequency-shifted transponder band to the first STB in a signal wherein the signal contains the carrier frequency of the signal is unique to the first STB and the carrier frequency that is unique to a second STB of the plurality of STBs.

* * * * *